US011715833B2

(12) United States Patent
Ikai et al.

(10) Patent No.: US 11,715,833 B2
(45) Date of Patent: Aug. 1, 2023

(54) FUEL CELL ELECTRODE CATALYST, METHOD FOR SELECTING THE SAME, AND FUEL CELL INCLUDING THE SAME

(71) Applicants: TOYOTA JIDOSHA KABUSHIKI KAISHA, Toyota (JP); CATALER CORPORATION, Kakegawa (JP)

(72) Inventors: Toshihiro Ikai, Okazaki (JP); Tomohiro Ishida, Hamamatsu (JP); Godai Kitayama, Hamamatsu (JP); Yousuke Horiuchi, Shimada (JP)

(73) Assignees: TOYOTA JIDOSHA KABUSHIKI KAISHA, Toyota (JP); CATALER CORPORATION, Kakegawa (JP)

( * ) Notice: Subject to any disclaimer, the term of this patent is extended or adjusted under 35 U.S.C. 154(b) by 0 days.

(21) Appl. No.: 17/653,966

(22) Filed: Mar. 8, 2022

(65) Prior Publication Data
US 2022/0293967 A1 Sep. 15, 2022

(30) Foreign Application Priority Data
Mar. 11, 2021 (JP) .............................. JP2021-039049

(51) Int. Cl.
*H01M 4/92* (2006.01)
*H01M 8/1004* (2016.01)
*H01M 8/10* (2016.01)
*H01M 4/86* (2006.01)

(52) U.S. Cl.
CPC ......... *H01M 4/925* (2013.01); *H01M 8/1004* (2013.01); *H01M 2004/8689* (2013.01); *H01M 2008/1095* (2013.01)

(58) Field of Classification Search
CPC .............. H01M 4/925; H01M 8/1004; H01M 2004/8689; H01M 2008/1095; H01M 4/921; H01M 4/926; H01M 8/1018; Y02E 60/50
See application file for complete search history.

(56) References Cited

U.S. PATENT DOCUMENTS

| | | |
|---|---|---|
| 2014/0024524 A1 | 1/2014 | Roh et al. |
| 2017/0244111 A1 | 8/2017 | Tsuchida et al. |
| 2017/0338495 A1 | 11/2017 | Horiuchi et al. |
| 2018/0316024 A1 | 11/2018 | Horiai et al. |

FOREIGN PATENT DOCUMENTS

| | | |
|---|---|---|
| JP | 2010092725 A | 4/2010 |
| JP | 2014018796 A | 2/2014 |
| JP | 2017144401 A | 8/2017 |
| JP | 2018190545 A | 11/2018 |
| WO | 2016063968 A1 | 4/2016 |

OTHER PUBLICATIONS

Partial translation of "Proposals of Goals, Research and Development Tasks, and Evaluation Methods for Polymer Electrolyte Fuel Cells," (online), Jan. 2011, Fuel Cell Commercialization Conference of Japan on the Internet at URL: http://fccj.jp/pdf/23_01_kt.pdf (searched on Feb. 24, 2021).
Minoru Isaida, U.S. Appl. No. 16/630,579, filed Jan. 13, 2020.

*Primary Examiner* — Helen Oi K Conley
(74) *Attorney, Agent, or Firm* — Dickinson Wright, PLLC

(57) ABSTRACT

A fuel cell electrode catalyst includes catalyst metal particles and electrically conductive support particles supporting the catalyst metal particles. In the fuel cell electrode catalyst, a proportion of a surface area occupied by the catalyst metal particles with particle sizes of 4.5 nm or less to a surface area of the catalyst metal particles calculated from a transmission electron microscope image is 5% or less.

4 Claims, 2 Drawing Sheets

FUEL CELL ELECTRODE CATALYST, METHOD FOR SELECTING THE SAME, AND FUEL CELL INCLUDING THE SAME

CROSS-REFERENCE TO RELATED APPLICATION

This application claims priority to Japanese Patent Application No. 2021-039049 filed on Mar. 11, 2021, incorporated herein by reference in its entirety.

BACKGROUND

1. Technical Field

The present disclosure relates to fuel cell electrode catalysts, methods for selecting the same, and fuel cells including the same.

2. Description of Related Art

Polymer electrolyte fuel cells are attracting attention as an energy source. The polymer electrolyte fuel cells are fuel cells that generate electric power by an electrochemical reaction between a fuel gas and an oxidant gas. The polymer electrolyte fuel cells can operate at room temperature and have a high output density. The polymer electrolyte fuel cells are therefore being actively studied as they are suitable for automobile applications etc.

The polymer electrolyte fuel cells typically use a membrane electrode assembly ("fuel electrode-polymer electrolyte membrane-air electrode") (hereinafter also referred to as "MEA"). The MEA is formed by bonding electrodes each made of a catalyst layer (a fuel electrode (anode catalyst layer) and an air electrode (cathode catalyst layer)) to both sides of a polymer electrolyte membrane that is an electrolyte membrane. A gas diffusion layer may further be bonded to both sides of the MEA. The assembly thus obtained is also referred to as a membrane electrode gas diffusion layer assembly ("gas diffusion layer-MEA-gas diffusion layer") (hereinafter also referred to as "MEGA").

Each electrode is made of a catalyst layer. The catalyst layer is a layer for causing an electrode reaction by an electrode catalyst included in the catalyst layer. Three-phase interfaces where three phases, namely an electrolyte, an electrode catalyst, and a reactant gas, are present are required in order to cause the electrode reaction to proceed. Therefore, the catalyst layer is typically a layer including an electrode catalyst and an electrolyte. The gas diffusion layer is a layer for supplying the reactant gas to the catalyst layer and giving and receiving electrons to and from the catalyst layer, and is made of a porous, electron-conducting material.

For example, the following fuel cell electrode catalysts are disclosed as electrode catalysts for use in such polymer electrolyte fuel cells. Japanese Unexamined Patent Application Publication No. 2018-190545 (JP 2018-190545 A) discloses a fuel cell electrode catalyst including catalyst metal particles containing platinum or a platinum alloy and support particles supporting the catalyst metal particles. In this fuel cell electrode catalyst, the support particles are particles of a carbonaceous material with a Brunauer-Emmett-Teller (BET) specific surface area of 700 $m^2/g$ or more, the average particle size of the catalyst metal particles is 2.5 to 4.5 nm, and the standard deviation of the particle size of the catalyst metal particles is 1.30 nm or less.

International Patent Publication No. WO 2016/063968 discloses a fuel cell electrode catalyst including a solid carbon support and a platinum-cobalt alloy supported on the support.

SUMMARY

Fuel cells deteriorate from use over time. One of the causes is the presence of fine particles of noble metal such as platinum and/or a platinum alloy in a fuel cell electrode catalyst that are hard to detect by X-ray diffraction (XRD). In fuel cells, the surface area of noble metal is an important physical property for fuel cell performance because the reaction occurs on the surface of active species (noble metal) on the electrode catalyst. It is known from first-principles calculation etc. that these fine particles of noble metal are more likely to dissolve than large particles of noble metal. The dissolved noble metal reprecipitates around the noble metal particles. Therefore, repeated dissolution and reprecipitation of the fine particles of noble metal would increase the particle size of the noble metal and reduce the surface area of the noble metal. As described above, the fine particles of noble metal have a high rate of dissolution and cause a decrease in surface area of the noble metal. Accordingly, when the fuel cell electrode catalyst contains a large amount of fine particles of noble metal, these fine particles of noble metal may cause deterioration of the fuel cell from use over time.

The present disclosure provides a fuel cell electrode catalyst with a reduced decrease in surface area of noble metal after a durability test, a method for selecting the same, and a fuel cell including the same.

The inventors found that a fuel cell electrode catalyst with a reduced content of fine noble metal particles can be selected by specifying the proportion of the surface area occupied by fine catalyst metal particles that may cause deterioration of a fuel cell and that are hard to detect even by XRD to the surface area of catalyst metal particles of a fuel cell electrode catalyst including catalyst metal particles and electrically conductive support particles supporting the catalyst metal particles. The inventors thus found that a fuel cell electrode catalyst with a reduced decease in surface area of noble metal after a durability test can be obtained by selecting such a fuel cell electrode catalyst.

The summary of the present disclosure is as follows.
(1) A fuel cell electrode catalyst includes: catalyst metal particles; and electrically conductive support particles supporting the catalyst metal particles. A proportion of a surface area occupied by the catalyst metal particles with particle sizes of 4.5 nm or less to a surface area of the catalyst metal particles calculated from a transmission electron microscope image is 5% or less.
(2) The fuel cell electrode catalyst according to (1) may be an electrode catalyst for a cathode catalyst layer.
(3) A polymer electrolyte fuel cell includes a membrane electrode assembly, the membrane electrode assembly being composed of an anode catalyst layer, a cathode catalyst layer, and a polymer electrolyte membrane interposed between the anode catalyst layer and the cathode catalyst layer. An electrode catalyst included in the cathode catalyst layer is the fuel cell electrode catalyst according to (1).
(4) A method for selecting a fuel cell electrode catalyst including catalyst metal particles and electrically conductive support particles supporting the catalyst metal particles includes selecting a fuel cell electrode catalyst in which a proportion of a surface area occupied by the catalyst metal particles with particle sizes of 4.5 nm or less to a surface area of the catalyst metal particles calculated from a transmission electron microscope image is 5% or less.

The present disclosure provides a fuel cell electrode catalyst with a reduced decrease in surface area of noble metal after a durability test, a method for selecting the same, and a fuel cell including the same.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
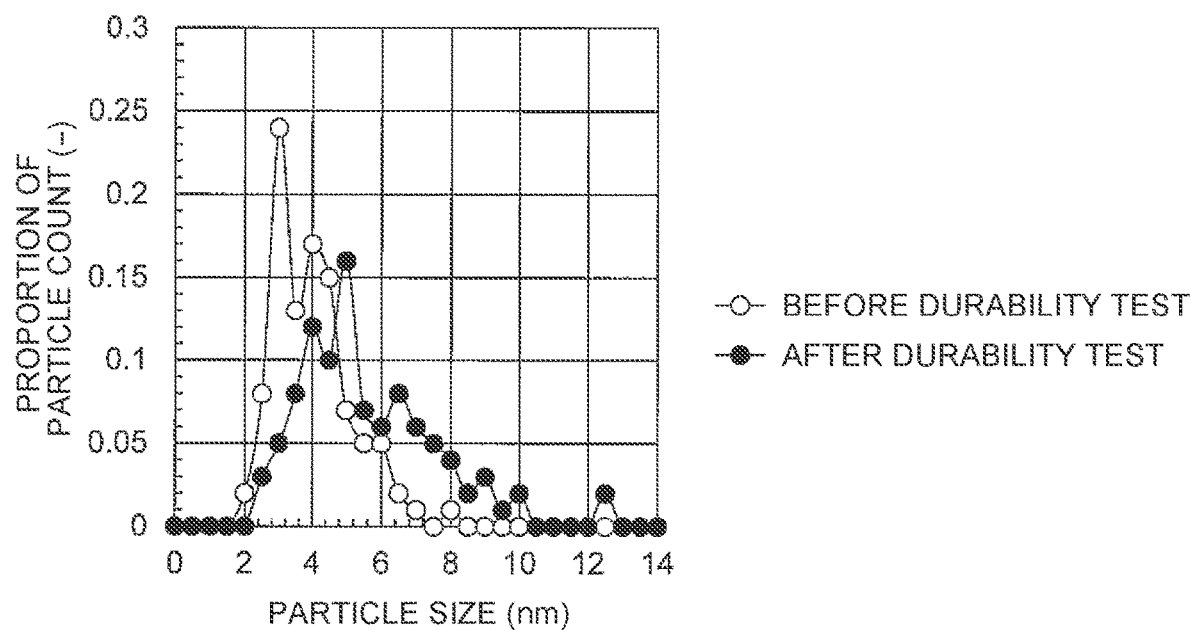
FIG. 1 is a graph showing the relationship between the particle size of platinum-cobalt alloy particles and the proportion of the count of platinum-cobalt alloy particles before and after a durability test for a carbon-supported platinum-cobalt alloy electrode catalyst of a comparative example.

Hereinafter, an embodiment of the present disclosure will be described in detail. A fuel cell electrode catalyst, a method for selecting the same, and a fuel cell including the same according to the present disclosure are not limited to the embodiment described below, and can be carried out in various forms such as modified or improved forms that can be made by those skilled in the art without departing from the spirit and scope of the disclosure.

The present disclosure relates to a fuel cell electrode catalyst including catalyst metal particles and electrically conductive support particles supporting the catalyst metal particles. In this fuel cell electrode catalyst, the proportion of the surface area occupied by catalyst metal particles that may cause deterioration of a fuel cell, namely catalyst metal particles with particle sizes of 4.5 nm or less, to the surface area of catalyst metal particles calculated from a transmission electron microscope (TEM) image is equal to or smaller than a certain value.

The catalyst metal particles are not limited as long as they catalyze the following reactions at the electrodes of a membrane electrode assembly.

$O_2+4H^++4e^- \rightarrow 2H_2O$   Air electrode (cathode catalyst layer):

$2H_2 \rightarrow 4H^++4e^-$   Hydrogen electrode (anode catalyst layer):

The catalyst metal particles can be those known in the art.

Examples of the catalyst metal particles include particles of noble metal and a noble metal alloy, such as platinum, a platinum alloy, palladium, rhodium, gold, silver, osmium, and iridium, and particles of a mixture of two or more of these substances. Examples of the platinum alloy include, but are not limited to, alloys of platinum and at least one of the following metals: aluminum, chromium, manganese, iron, cobalt, nickel, gallium, zirconium, molybdenum, ruthenium, rhodium, palladium, vanadium, tungsten, rhenium, osmium, iridium, titanium, and lead.

The catalyst metal particles are preferably particles of platinum and/or a platinum alloy such as a platinum-cobalt alloy.

The electrically conductive support particles are not limited and can be a support known in the art. Examples of the electrically conductive support particles include: carbon materials such as carbon black, carbon nanotubes, and carbon nanofibers; carbon compounds such as silicon carbide; tin oxide; and mixtures of two or more of these substances.

The Brunauer-Emmett-Teller (BET) specific surface area of the electrically conductive support particles is usually, but is not limited to, 600 m$^2$/g to 900 m$^2$/g.

The content of the catalyst metal particles is usually, but is not limited to, 5 wt % to 70 wt %, preferably 10 wt % to 60 wt %, based on the total weight of the fuel cell electrode catalyst.

In the fuel cell electrode catalyst of the present disclosure, the proportion of the surface area occupied by catalyst metal particles with particle sizes of 4.5 nm or less to the surface area of catalyst metal particles calculated from a transmission electron microscope (TEM) image is 5% or less.

The proportion of the surface area occupied by catalyst metal particles with particle sizes of 4.5 nm or less to the surface area of catalyst metal particles calculated from a TEM image is calculated as follows.

(1) Images of a fuel cell electrode catalyst that is used for the calculation are captured by a TEM, and 100 catalyst metal particles are randomly selected from the TEM images of at least four fields of view to produce a particle size distribution. The selection of the catalyst metal particles from the TEM images can be verified by energy-dispersive X-ray spectroscopy (EDX). The particle size of a catalyst metal particle is herein the average of the major and minor axes of the particle.

(2) The proportion of the surface area in each particle size range is calculated from the particle size distribution information obtained in (1) and weight information of the catalyst metal included in the fuel cell electrode catalyst.

Total weight of catalyst metal particles in each particle size range=average volume of single catalyst metal particle in each particle size range× density of catalyst metal×frequency(count) of catalyst metal particles in each particle size range obtained from particle size distribution   Expression 1

Weight proportion of catalyst metal particles in each particle size range=total weight of catalyst metal particles in each particle size range/total weight of catalyst metal particles   Expression 2

Count of catalyst metal particles in each particle size range=(weight proportion of catalyst metal particles in each particle size range×catalyst metal support density of catalyst)/(average volume of single catalyst metal particle in each particle size range×density of catalyst metal)   Expression 3

Total surface area of catalyst metal particles in each particle size range=average surface area of single catalyst metal particle in each particle size range×count of catalyst metal particles in each particle size range   Expression 4

Proportion of surface area of catalyst metal particles in each particle size range=total surface area of catalyst metal particles in each particle size range/total surface area of catalyst metal particles     Expression 5

(3) The proportion of the surface area occupied by catalyst metal particles with particle sizes of 4.5 nm or less to the total surface area of catalyst metal particles is calculated.

In the fuel cell electrode catalyst of the present disclosure, the proportion of the surface area occupied by catalyst metal particles with particle sizes of 4.5 nm or less to the surface area of catalyst metal particles calculated from a TEM image is within the range specified above. The fuel cell electrode catalyst of the present disclosure therefore has a lower content of fine particles of noble metal that may cause deterioration of a fuel cell than conventional fuel cell electrode catalysts. As a result, a decrease in surface area of noble metal after a durability test of the fuel cell electrode catalyst can be reduced.

The fuel cell electrode catalyst of the present disclosure can be used as an electrode catalyst for a cathode catalyst layer and/or an anode catalyst layer in a fuel cell. The fuel cell electrode catalyst of the present disclosure is preferably used as an electrode catalyst for a cathode catalyst layer in a fuel cell. By using the fuel cell electrode catalyst of the present disclosure as an electrode catalyst for a cathode catalyst layer, dissolution of noble metal in the cathode catalyst layer in which noble metal may dissolve is reduced, and durability of the fuel cell can be improved.

The fuel cell electrode catalyst of the present disclosure can be manufactured by a known method except that the BET specific surface area of support particles is 600 m$^2$/g to 900 m$^2$/g and that such catalyst metal particle-supporting particles that the proportion of the surface area occupied by catalyst metal particles with particle sizes of 4.5 nm or less to the surface area of catalyst metal particles calculated from a TEM image is within the range specified above are selected from produced catalyst metal particle-supporting particles.

For example, the fuel cell electrode catalyst of the present disclosure can be prepared as follows.

(1) Support particles with a specific BET specific surface area such as carbon particles and a noble metal precursor such as a platinum precursor are suspended in a solvent such as pure water to produce a suspension. The platinum precursor is, for example, a dinitrodiammine platinum nitric acid solution.

(2) The noble metal precursor in the suspension produced in (1) is reduced to noble metal usually at room temperature (about 20° C.) to 100° C. using a reducing agent such as ethanol or sodium borohydride to produce a dispersion. When the noble metal in the fuel cell electrode catalyst is a platinum alloy, a solution containing a metal contained in the alloy, such as cobalt, in the form of ions is added to the dispersion, and the pH etc. of the resultant dispersion is adjusted to precipitate the metal in the form of hydroxide, carbonate, etc.

(3) The dispersion produced in (2) is filtered, and the cake is dried usually at 80° C. to 120° C. for 1 hour to 12 hours into a powder.

(4) The powder obtained in (3) is fired in an inert atmosphere such as a nitrogen or argon atmosphere usually at 100° C. to 1200° C. for 1 hour to 8 hours to obtain catalyst metal particle-supporting particles.

The firing of (4) is performed in order to improve durability of the fuel cell electrode catalyst when used at high temperatures. The firing is performed within the range in which the pore diameter and pore volume of the support particles do not change, and is suitably performed under the conditions mentioned in (4).

When the catalyst metal particle-supporting particles obtained in (4) contain impurities such as the metal added in (2), the catalyst metal particle-supporting particles obtained in (4) can be added to a solution containing an acid, a base, etc. The impurities can thus be dissolved in the solution and removed.

(5) Such catalyst metal particle-supporting particles that the proportion of the surface area occupied by catalyst metal particles with particle sizes of 4.5 nm or less to the surface area of catalyst metal particles calculated from a TEM image is within the range specified above are selected from the catalyst metal particle-supporting particles obtained in (4).

The present disclosure also relates to a fuel cell including the fuel cell electrode catalyst of the present disclosure, that is, a polymer electrolyte fuel cell including a membrane electrode assembly composed of an anode catalyst layer, a cathode catalyst layer, and a polymer electrolyte membrane interposed between the anode catalyst layer and the cathode catalyst layer, an electrode catalyst of the anode catalyst layer and/or the cathode catalyst layer being the fuel cell electrode catalyst of the present disclosure.

The polymer electrolyte membrane is preferably a proton-conducting electrolyte membrane. The proton-conducting electrolyte membrane can be a proton-conducting electrolyte membrane known in the art. Examples of the proton-conducting electrolyte membrane include, but are not limited to, membranes made of an electrolyte such as fluororesin containing sulfonic acid groups (e.g., Nafion (made by DuPont), FLEMION (made by AGC), or Aciplex (made by Asahi Kasei Corporation)).

The thickness of the polymer electrolyte membrane is usually, but is not limited to, 5 μm to 50 μm in order to improve the function of the proton conductivity.

The anode catalyst layer serves as a fuel electrode, that is, a hydrogen electrode, and the cathode catalyst layer serves as an air electrode (oxygen electrode). Each catalyst layer includes an electrode catalyst and an electrolyte.

The anode catalyst layer and/or the cathode catalyst layer includes the fuel cell electrode catalyst of the present disclosure as an electrode catalyst. The fuel cell electrode catalyst of the present disclosure is as described above.

When the anode catalyst layer or the cathode catalyst layer does not include the fuel cell electrode catalyst of the present disclosure as an electrode catalyst, the electrode catalyst of the anode catalyst layer or the cathode catalyst layer can be an electrode catalyst known in the art.

In the polymer electrolyte fuel cell of the present disclosure, the cathode catalyst layer preferably includes the fuel cell electrode catalyst of the present disclosure. As the cathode catalyst layer includes the fuel cell electrode catalyst of the present disclosure, dissolution of noble metal in the cathode catalyst layer in which noble metal may dissolve is reduced, and durability of the fuel cell can be improved.

The content of the electrode catalyst in each catalyst layer is usually, but is not limited to, 5 wt % to 40 wt % based on the total weight of the catalyst layer.

The electrolyte is preferably, but is not limited to, an ionomer. An ionomer is also called cation exchange resin and exists in clusters of ionomer molecules. The ionomer can be an ionomer known in the art. Examples of the ionomer include, but are not limited to: fluororesin electrolytes such as a perfluorosulfonic acid resin material; sulfonated plastic electrolytes such as sulfonated polyether ketone, sulfonated polyether sulfone, sulfonated polyether ether sulfone, sulfonated polysulfone, sulfonated polysulfide, and sulfonated polyphenylene; sulfoalkylated plastic electrolytes such as sulfoalkylated polyether ether ketone, sulfoalkylated polyether sulfone, sulfoalkylated polyether ether sulfone, sulfoalkylated polysulfone, sulfoalkylated polysulfide, and sulfoalkylated polyphenylene; and mixtures of two or more of these substances.

The thickness of each catalyst layer is usually, but is not limited to, 1 µm to 20 µm in order to provide the amount of catalyst required for power generation and to maintain low proton resistance.

The polymer electrolyte fuel cell of the present disclosure can be manufactured by a method known in the art.

For example, the polymer electrolyte fuel cell of the present disclosure can be prepared as follows.

(1) The fuel cell electrode catalyst of the present disclosure and an electrolyte such as an electrolyte containing the same components as those of a polymer electrolyte membrane are suspended in a solvent such as pure water to prepare a catalyst ink. At this time, ultrasonic dispersion etc. may be used in order to obtain a uniform catalyst ink.

(2) The catalyst ink obtained in (1) is sprayed to, or is caused to adhere to, a peelable base material such as a Teflon sheet to form a catalyst layer precursor. For example, a method using gravity, spraying force, or electrostatic force can be used for the spraying and adhesion.

(3) The catalyst layer precursor on the base material is dried to prepare a catalyst layer on the base material, and the catalyst layer is peeled off from the base material. The catalyst layer is thus obtained.

In (2) and (3), the catalyst layer is obtained by spraying the catalyst ink to, or causing the catalyst ink to adhere to, the base material and then performing drying and peeling the catalyst layer off from the base material. Alternatively, the catalyst layer may be prepared by spraying the catalyst ink directly to, or causing the catalyst ink to adhere directly to, the surface of the polymer electrolyte membrane and then performing drying.

(4) The catalyst layer obtained in (3) is used as an air electrode. For example, the catalyst layer obtained in (3) or a catalyst layer prepared using a commercially available platinum carbon (Pt/C) catalyst instead of the fuel cell electrode catalyst of the present disclosure of (1) is used as a fuel electrode. A layer stack is obtained by placing the air electrode on one surface of the polymer electrolyte membrane and placing the fuel electrode on the other surface of the polymer electrolyte membrane. In some cases, a diffusion layer such as an electrically conductive porous sheet may be placed outside each of the air electrode and the fuel electrode. The electrically conductive porous sheet is, for example, a sheet made of an air or liquid permeable material such as carbon cloth or carbon paper.

(5) The layer stack obtained in (4), namely the stack of (the diffusion layer), the air electrode, the polymer electrolyte membrane, and the fuel electrode, (and the diffusion layer), is bonded together by hot press usually at 100° C. to 200° C., for example, 140° C., for 5 seconds to 600 seconds, for example, 300 seconds, to obtain a membrane electrode assembly or an MEGA.

(6) Separators along which gas flows are placed on both sides of the membrane electrode assembly or MEGA obtained in (5). A single cell is thus obtained. The polymer electrolyte fuel cell is obtained by stacking a plurality of the single cells.

The polymer electrolyte fuel cell of the present disclosure has improved durability and power generation performance.

Hereinafter, some examples of the present disclosure will be described, but these examples are not intended to limit the present disclosure to the forms shown in the examples.

I. Pre-Examination
i. Sample Preparation
Preparation of Carbon-Supported Platinum-Cobalt Alloy Electrode Catalyst of Comparative Example A carbon support (BET specific surface area: 1000 $m^2/g$ to 1300 $m^2/g$) as support particles was suspended in dilute nitric acid. A dinitrodiammine platinum nitric acid solution was then added to the suspension, and the resultant suspension was stirred. Ethanol was further added to this suspension, and the resultant suspension was heated (room temperature (about 20° C.) to 100° C.) to reduce platinum ions by the reducing action of ethanol. Platinum-supporting carbon was thus obtained.

This platinum-supporting carbon was suspended in a cobalt nitrate solution. A basic solution such as ammonia was then added to the suspension. The pH of the suspension was thus adjusted to 7 or more to precipitate cobalt in the form of cobalt hydroxide on the platinum-supporting carbon. The suspension was then filtered to obtain platinum-supporting carbon with cobalt hydroxide adsorbed thereon.

The platinum-supporting carbon with cobalt hydroxide adsorbed thereon was dried at 80° C. to 120° C. for 1 hour to 12 hours. The powder thus obtained was fired at 100° C. to 1200° C. for 1 hour to 8 hours in an inert gas (nitrogen or argon) atmosphere to produce platinum-cobalt alloy particles. Platinum-cobalt alloy-supporting carbon was thus obtained.

The obtained platinum-cobalt alloy-supporting carbon was suspended in dilute nitric acid. The suspension was adjusted to the temperature range of room temperature (about 20° C.) to 100° C. and stirred for 30 minutes or more to remove cobalt from the surfaces of the alloy particles. A carbon-supported platinum-cobalt alloy electrode catalyst was thus obtained.

ii. Analysis
TEM Analysis

Images of the carbon-supported platinum-cobalt alloy electrode catalyst of the comparative example were captured by a TEM, and 100 platinum-cobalt alloy particles (Pt alloy particles) were randomly selected from the TEM images of at least four fields of view to produce a particle size distribution. The particle size of a platinum-cobalt alloy particle is herein the average of the major and minor axes of the particle.

Regarding this carbon-supported platinum-cobalt alloy electrode catalyst, load response durability was evaluated based on the method described in the section "I-4-1 MEA Durability (Electrolyte Membrane, Catalyst)" of "Proposals of Goals, Research and Development Tasks, and Evaluation Methods for Polymer Electrolyte Fuel Cells," (online), January 2011, Fuel Cell Commercialization Conference of Japan on the Internet at URL: http://fccj.jp/pdf/23_01_kt.pdf (searched on Feb. 24, 2021).

Specifically, an MEGA was first produced using the carbon-supported platinum-cobalt alloy electrode catalyst. Next, a potential cycling test (durability test) was performed on the MEGA under the following test conditions.

Test Conditions
Temperature: 80° C.
Gas pressure: normal pressure
Relative humidity: 100%
Anode: $H_2$
Cathode: $N_2$
Load response: 0.6 V to 1.0 V Number of cycles: 100,000 cycles After the potential cycling test, images of the catalyst layer of the MEGA were captured again by the TEM, and 100 platinum-cobalt alloy particles were randomly selected from the TEM images to similarly produce a particle size distribution.

For the carbon-supported platinum-cobalt alloy electrode catalyst, a change in weight of platinum-cobalt alloy particles of each particle size before and after the durability test was examined using the obtained particle size distribution information and the following Expression 6.

Total weight of Pt alloy particles in each particle size range=average volume of single Pt alloy particle in each particle size range×density of Pt alloy×frequency(count) of Pt alloy particles in each particle size range obtained from particle size distribution       Expression 6 iii. Results

Figure 2:
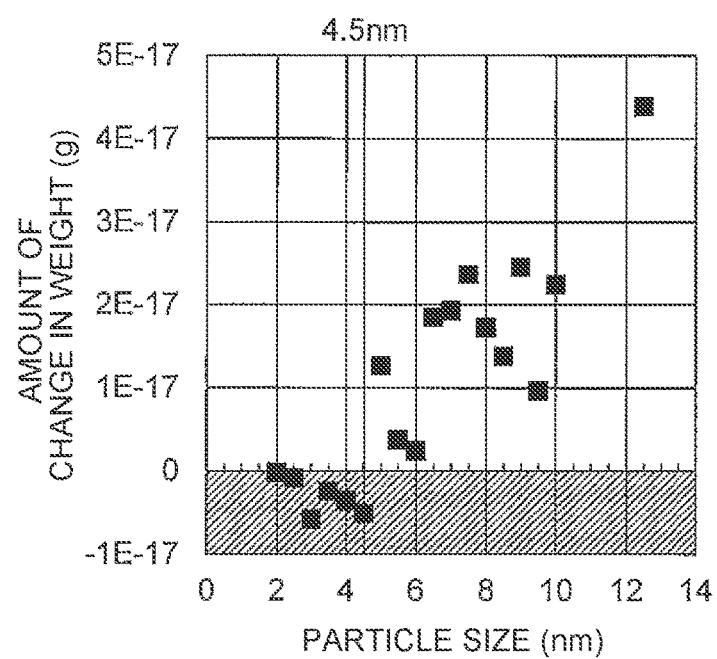
FIG. 2 is a graph showing the relationship between the particle size of platinum-cobalt alloy particles and the amount of change in weight of platinum-cobalt alloy particles before and after the durability test for the carbon-supported platinum-cobalt alloy electrode catalyst of the comparative example.

FIG. 1 shows the relationship between the particle size of platinum-cobalt alloy particles and the proportion of the count of platinum-cobalt alloy particles before and after the durability test for the carbon-supported platinum-cobalt alloy electrode catalyst of the comparative example. FIG. 2 shows the relationship between the particle size of platinum-cobalt alloy particles and the amount of change in weight of platinum-cobalt alloy particles before and after the durability test for the carbon-supported platinum-cobalt alloy electrode catalyst of the comparative example.

The results of FIG. 1 indicate that the count of platinum-cobalt alloy particles with particle sizes of 4.5 nm or less was reduced by the durability test. The results of FIG. 2 indicate that a change in weight before and after the durability test was negative for the platinum-cobalt alloy particles with particle sizes of 4.5 nm or less. It was thus found that the count of platinum-cobalt alloy particles with particle sizes of 4.5 nm or less was reduced by the durability test due to dissolution etc.

Accordingly, it was found from FIGS. 1 and 2 that the platinum-cobalt alloy particles with particle sizes of 4.5 nm or less tended to dissolve.

II. Examination i. Sample Preparation

Preparation of Carbon-Supported Platinum-Cobalt Alloy Electrode Catalysts of Comparative Example Group Several kinds of carbon-supported platinum-cobalt alloy electrode catalysts of a comparative example group were prepared in a manner similar to that described in the preparation of the carbon-supported platinum-cobalt alloy electrode catalyst of the comparative example.

Images of each carbon-supported platinum-cobalt alloy electrode catalyst of the comparative example group were captured by a TEM, and 100 platinum-cobalt alloy particles were randomly selected from the TEM images of at least four fields of view to produce a particle size distribution. The particle size of a platinum-cobalt alloy particle is herein the average of the major and minor axes of the particle.

For each carbon-supported platinum-cobalt alloy electrode catalyst of the comparative example group, the proportion of the surface area occupied by platinum-cobalt alloy particles with particle sizes of 4.5 nm or less to the surface area of platinum-cobalt alloy particles was calculated using the following Expressions 7 to 11.

Total weight of Pt alloy particles in each particle size range=average volume of single Pt alloy particle in each particle size range×density of Pt alloy×frequency(count) of Pt alloy particles in each particle size range obtained from particle size distribution       Expression 7

Weight proportion of Pt alloy particles in each particle size range=total weight of Pt alloy particles in each particle size range/total weight of Pt alloy particles       Expression 8

Count of Pt alloy particles in each particle size range=(weight proportion of Pt alloy particles in each particle size range×Pt alloy support density of catalyst)/(average volume of single Pt alloy particle in each particle size range× density of Pt alloy)       Expression 9

Total surface area of Pt alloy particles in each particle size range=average surface area of single Pt alloy particle in each particle size range× count of Pt alloy particles in each particle size range       Expression 10

Proportion of surface area of Pt alloy particles in each particle size range=total surface area of Pt alloy particles in each particle size range/total surface area of Pt alloy particles       Expression 11

Preparation of Carbon-Supported Platinum-Cobalt Alloy Electrode Catalysts of Example Group Carbon-supported platinum-cobalt alloy electrode catalysts of an example group were prepared in a manner similar to that of the carbon-supported platinum-cobalt alloy electrode catalysts of the comparative example group except for the following points. Several kinds of carbon-supported platinum-cobalt alloy electrode catalysts were prepared by using a carbon support (BET specific surface area: 600 m$^2$/g to 900 m$^2$/g) as support particles instead of the carbon support (BET specific surface area: 1000 m$^2$/g to 1300 m$^2$/g), the proportion of the surface area occupied by platinum-cobalt alloy particles with particle sizes of 4.5 nm or less to the surface area of platinum-cobalt alloy particles was calculated for each carbon-supported platinum-cobalt alloy electrode catalyst by a method similar to that used for the carbon-supported platinum-cobalt alloy electrode catalysts of the comparative example group, and the carbon-supported platinum-cobalt alloy electrode catalyst in which the proportion of the surface area occupied by platinum-cobalt alloy particles with particle sizes of 4.5 nm or less to the surface area of platinum-cobalt alloy particles is 5% or less is selected from the several kinds of carbon-supported platinum-cobalt alloy electrode catalysts.

ii. Analysis

Measurement of Rate of Decrease in Surface Area after Durability Test

Regarding the carbon-supported platinum-cobalt alloy electrode catalysts of the comparative example group and the example group, load response durability was evaluated based on the method described in the section "I-4-1 MEA Durability (Electrolyte Membrane, Catalyst)" of "Proposals of Goals, Research and Development Tasks, and Evaluation Methods for Polymer Electrolyte Fuel Cells," (online), January 2011, Fuel Cell Commercialization Conference of Japan on the Internet at URL: http://fccj.jp/pdf/23_01_kt.pdf (searched on Feb. 24, 2021), and a change in surface area of platinum before and after the evaluation was examined.

Specifically, MEGAs were first produced using each of the carbon-supported platinum-cobalt alloy electrode catalysts of the comparative example group and the example group. Next, cyclic voltammetry (CV) was performed on each of the obtained MEGAs to calculate the electrochemically active surface area (ECSA) of platinum. Subsequently, a potential cycling test (durability test) was performed on each MEGA under the following test conditions. After the potential cycling test, CV was performed again on each MEGA to calculate the ECSA of platinum. The rate of decrease in surface area after the durability test was calculated for each carbon-supported platinum-cobalt alloy electrode catalyst based on the ECSAs of platinum calculated by the CV before and after the potential cycling test.

Test Conditions
Temperature: 80° C.
Gas pressure: normal pressure
Relative humidity: 100%
Anode: $H_2$
Cathode: $N_2$
Load response: 0.6 V to 1.0 V
Number of cycles: 100,000 cycles iii. Results FIG. 3 shows the relationship between the proportion of the surface area occupied by platinum-cobalt alloy particles with particle sizes of 4.5 nm or less to the surface area of platinum-cobalt alloy particles and the rate of decrease in surface area of platinum-cobalt alloy particles after the durability test for the carbon-supported platinum-cobalt alloy electrode catalysts of the comparative example group and the example group.

Figure 3:
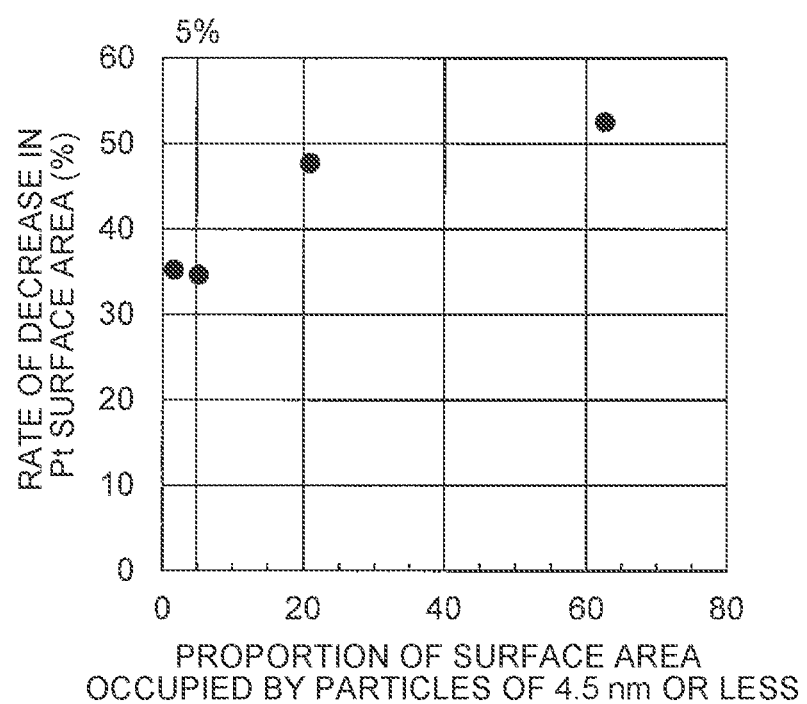
FIG. 3 is a graph showing the relationship between the proportion of the surface area occupied by platinum-cobalt alloy particles with particle sizes of 4.5 nm or less to the surface area of platinum-cobalt alloy particles and the rate of decrease in surface area of platinum-cobalt alloy particles after the durability test for carbon-supported platinum-cobalt alloy electrode catalysts of a comparative example group and an example group.

It was found from FIG. 3 that the carbon-supported platinum-cobalt alloy electrode catalysts of the example group, that is, the carbon-supported platinum-cobalt alloy electrode catalysts in which the proportion of the surface area occupied by platinum-cobalt alloy particles with particle sizes of 4.5 nm or less was 5% or less, had a lower rate of decrease in surface area of platinum-cobalt alloy particles after the durability test than the carbon-supported platinum-cobalt alloy electrode catalysts of the comparative example group.

What is claimed is:

1. A fuel cell electrode catalyst, comprising:
catalyst metal particles; and
electrically conductive support particles supporting the catalyst metal particles, wherein a proportion of a surface area occupied by the catalyst metal particles with particle sizes of 4.5 nm or less to a surface area of the catalyst metal particles calculated from a transmission electron microscope image is 5% or less.

2. The fuel cell electrode catalyst according to claim 1, wherein the fuel cell electrode catalyst is an electrode catalyst for a cathode catalyst layer.

3. A polymer electrolyte fuel cell comprising a membrane electrode assembly, the membrane electrode assembly being composed of an anode catalyst layer, a cathode catalyst layer, and a polymer electrolyte membrane interposed between the anode catalyst layer and the cathode catalyst layer, wherein an electrode catalyst included in the cathode catalyst layer is the fuel cell electrode catalyst according to claim 1.

4. A method for selecting a fuel cell electrode catalyst including catalyst metal particles and electrically conductive support particles supporting the catalyst metal particles, the method comprising selecting a fuel cell electrode catalyst in which a proportion of a surface area occupied by the catalyst metal particles with particle sizes of 4.5 nm or less to a surface area of the catalyst metal particles calculated from a transmission electron microscope image is 5% or less.

* * * * *